No. 889,132. PATENTED MAY 26, 1908.
H. HOWARD.
METHOD OF PREPARING SOLUTIONS OF GASES.
APPLICATION FILED NOV. 5, 1906.
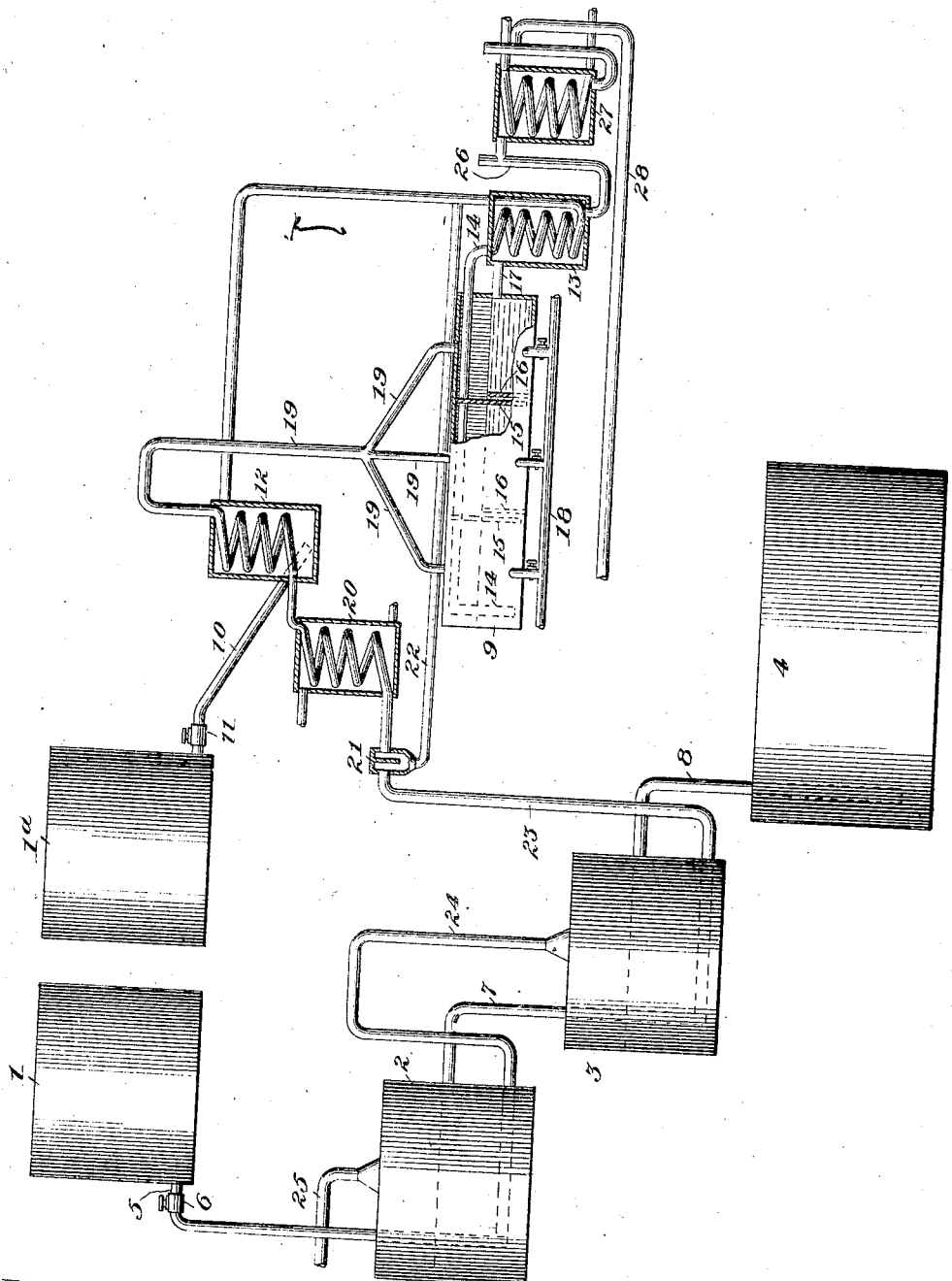
Witnesses:
Inventor:
Henry Howard
Attys.

UNITED STATES PATENT OFFICE.

HENRY HOWARD, OF NORTH WOBURN, MASSACHUSETTS.

METHOD OF PREPARING SOLUTIONS OF GASES.

No. 889,132.  Specification of Letters Patent.  Patented May 26, 1908.

Application filed November 5, 1906. Serial No. 342,132.

*To all whom it may concern:*

Be it known that I, HENRY HOWARD, a citizen of the United States, residing at North Woburn, in the county of Middlesex and State of Massachusetts, have invented certain new and useful Improvements in Methods of Preparing Solutions of Gases, of which the following is a specification.

This invention is a method of preparing solutions of gases of any desired concentration The invention will be described as applied to the preparation of sulfite liquors containing free sulfur dioxid, but is not restricted thereto.

In the use of sulfite solutions for the production of cellulose, it is essential for the most effective and economical working that the solution should contain a certain proportion of uncombined sulfur dioxid, and that this proportion should be within the control of the operator. When such liquors are produced by subjecting a solution containing lime or other base to contact with sulfur dioxid produced by burning sulfur or pyrites in air, and more particularly in the latter case by reason of the greater dilution of the sulfur dioxid, it often occurs that the percentage of free sulfur dioxid is less than is desirable or necessary. According to my invention such percentage is increased to any desired extent, up to the amount corresponding to the saturation point of a solution of given temperature under an atmosphere of pure sulfur dioxid at a given pressure. I accomplish this result by bringing the diluted sulfur dioxid produced by the combustion of sulfur or of pyrites into contact with a solvent liquor, such for instance as water, and absorbing it therein; I then expel the absorbed gas from such liquor or a portion thereof, and after separating part or all of the moisture from the gas, if this should be deemed desirable, I cause the gas to be absorbed, to the desired extent, in the sulfite liquor or other absorbing medium. Preferably, I prepare a solution of sulfur dioxid or sulfurous acid by absorbing burner gases in water under atmospheric or higher pressure, and subsequently expel the gas from said solution or any required portion thereof and absorb it in the sulfite or other liquor, thereby supplying such quantity of gas to the liquor as may be required, or increasing the gas content of the same to any desired extent. The liquid from which the gas has been expelled is then brought into contact with the burner gases for restoring its content of sulfur dioxid. The method is readily made continuous, and any desired sulfur dioxid content is secured by properly proportioning the quantity of solvent from which the gas is expelled to that of the absorbing medium in which the expelled gas is absorbed. Preferably also, I effect an interchange of heat between the expelled gas and the inflowing solution, and between the heated liquor and inflowing solution, whereby considerable economy is effected.

For a full understanding of my invention reference is made to the accompanying drawing wherein the figure is an elevation, partly in section, of one form of apparatus for carrying my method into effect.

1 is a storage tank for sulfite liquors prepared from burner gases in the usual manner. 2, 3 are saturation tanks wherein the sulfur dioxid content of this liquor may be increased, and 4 is a storage tank for the resulting sulfite solution. Solution flows from tank 1 through pipe 5 having a cock 6 to the saturater 2, overflows therefrom through pipe 7 to the saturater 3 and passes thence by pipe 8 to the storage tank 4.

1ª is a storage tank for water or other solvent containing sulfur dioxid, the solution having preferably been prepared by the use of burner gases as above mentioned: from this tank solution is permitted to flow through pipe 10 provided with a cock 11 to a boiler or sulfur dioxid generator 9, traversing in its passage two heaters or heat-interchangers 12 and 13 each of which is shown as comprising a coil within a closed tank, the solution from tank 1ª passing around the coil in heater 12 and through the coil in heater 13: From heater 13 the solution passes by pipe 14 to the generator 9. This generator may be of any suitable construction; as shown it comprises a relatively shallow closed tank subdivided into several compartments or partitions 15, 16 so arranged as to afford a restricted communication between adjacent compartments, liquid being introduced at one end of the tank through pipe 14, traversing the several compartments in succession and escaping at the opposite end through pipe 17. Live steam is blown into the generator through pipe 18 having inlets to the several compartments, and serves to expel the sulfur dioxid from the solution therein. The expelled gas, together with the steam, is conducted through pipes 19 to the coil in heater 12, imparting a portion of its heat to the solution from tank 1ª; it may then be further cooled by means of water or other cooling medium in a condenser 20, and passes thence to a separator or trap 21 of any usual construction. The separated liquid, consisting of water saturated with sulfur dioxid, flows from the trap 21 to the generator 9 through pipe 22, preferably traversing the heater 13 as shown. The substantially pure sulfur dioxid is conducted from the trap 21 by pipe 23 to the saturater 3 wherein it is wholly or in part absorbed by the liquor from tank 1ª, any unabsorbed portion passing by pipe 24 to saturater 2 thence by pipe 25 to be added to the burner gases and utilized in the preparation of further quantities of sulfite solution or of the aqueous or other solution from which the gas is to be expelled. The heated solution from which sulfur dioxid has been expelled in the generator 9 overflows therefrom through pipe 17 into heater 13; thence it may be permitted to flow by pipe 26 to a cooler 27 in which it is fully cooled by water, passing then through pipe 28 to the usual absorbing system wherein it is brought into contact with the burner gases and prepared for further use.

It will be observed that the volume and sulfur dioxid content of the prepared solution passing to the storage tank 4 is absolutely controlled by manipulation of cocks 6 and 11, the concentration of this solution with respect to sulfur dioxid being increased or diminished by permitting a greater or smaller quantity of the solution from tank 1ª to pass to the generator 9. In practice cocks 6 and 11 are so manipulated as to insure at all times the preparation of solution corresponding in volume and in the percentage of absorbed gas to the requirements of the digesters.

In my Patent 836,500, issued Nov. 20, 1906, I have described and claimed a method of preparing solutions of gases consisting in expelling the gas from one portion of a partially saturated liquid, and absorbing it in another portion of the same liquid, the portion of the liquid from which the gas has been expelled being thereafter subjected to contact with additional gas to again partially saturate it. The specific invention herein described and claimed differs from the above in that the gas expelled from a liquid, which may be partially or completely saturated, is absorbed in a medium other than said liquid.

1. The method of preparing solutions of gases, which consists in dissolving a gas in a solvent by contact with the gas in diluted form, then expelling the gas from the resulting solution and absorbing the relatively concentrated gas in an absorbing medium other than said solution, whereby a solution of relatively high concentration is obtained, substantially as described.

2. The method of preparing sulfite solutions, which consists in dissolving sulfur dioxid in water by contact with the gas in diluted form, then expelling the gas from the water and absorbing the relatively concentrated gas in a sulfite solution, substantially as described.

3. The method of preparing solutions of gases, which consists in dissolving a gas in a solvent by contact with the gas in diluted form, then expelling the gas from the resulting solution and absorbing the relatively concentrated gas in an absorbing medium other than said solution, whereby a solution of relatively high concentration is obtained, and subjecting the liquid from which the gas has been expelled to contact with additional gas to restore its content thereof, substantially as described.

4. The method of preparing solutions of gases, which consists in dissolving a gas in a solvent by contact with the gas in diluted form, then expelling the gas from the resulting solution by heat, cooling the expelled gas, and absorbing the relatively concentrated gas in an absorbing medium other than said solution, whereby a solution of relatively high concentration is obtained, substantially as described.

5. The method of preparing solutions of gases, which consists in dissolving a gas in a solvent by contact with the gas in diluted form, then expelling the gas from the resulting solution by heat, cooling the expelled gas by transferring heat therefrom to the inflowing solution, and absorbing the relatively concentrated gas in an absorbing medium other than said solution, whereby a solution of relatively high concentration is obtained, substantially as described.

6. The method of preparing sulfite solutions, which consists in dissolving sulfur dioxid in water by contact with the gas in diluted form, then expelling the gas by heat, cooling the expelled sulfur dioxid and absorbing the relatively concentrated gas in a sulfite solution, substantially as described.

7. The method of preparing sulfite solutions, which consists in dissolving sulfur dioxid in water by contact with the gas in diluted form, then expelling the gas by heat, cooling the expelled gas by transferring heat therefrom to the inflowing solution and absorbing the relatively concentrated gas in a sulfite solution, substantially as described.

8. The method of preparing sulfite liquor, which consists in bringing diluted sulfur dioxid into presence of water and thereby forming a solution containing the gas, then expelling the gas from said solution, separating moisture therefrom, and absorbing the relatively concentrated gas in a sulfite solution, substantially as described.

In testimony whereof, I affix my signature in presence of two witnesses.

HENRY HOWARD.

Witnesses:
S. W. WILDER,
ALICE B. PIPER.